United States Patent
Yin et al.

(10) Patent No.: US 12,493,581 B2
(45) Date of Patent: Dec. 9, 2025

(54) MIDDLEWARE SYSTEM AND METHOD FOR OPTIMIZING READING AND WRITING OF SCIENTIFIC DATA FILES

(71) Applicant: ShanghaiTech University, Shanghai (CN)

(72) Inventors: Shu Yin, Shanghai (CN); Tianyuan Wu, Shanghai (CN)

(73) Assignee: ShanghaiTech University, Shanghai (CN)

(*) Notice: Subject to any disclaimer, the term of this patent is extended or adjusted under 35 U.S.C. 154(b) by 0 days.

(21) Appl. No.: 18/866,060

(22) PCT Filed: Feb. 21, 2023

(86) PCT No.: PCT/CN2023/077448
§ 371 (c)(1),
(2) Date: Nov. 14, 2024

(87) PCT Pub. No.: WO2024/159560
PCT Pub. Date: Aug. 8, 2024

(65) Prior Publication Data
US 2025/0342137 A1  Nov. 6, 2025

(30) Foreign Application Priority Data
Jan. 31, 2023 (CN) .......................... 202310091808.4

(51) Int. Cl.
*G06F 16/16* (2019.01)
(52) U.S. Cl.
CPC .................................. *G06F 16/16* (2019.01)

(58) Field of Classification Search
CPC .......... G06F 16/16; G06F 16/00; G06F 16/13; G06F 16/22
See application file for complete search history.

(56) References Cited

U.S. PATENT DOCUMENTS

2018/0095959 A1* 4/2018 Rathee ................... G06F 16/51
2018/0210919 A1* 7/2018 Mazumder ............. G06F 16/13
(Continued)

FOREIGN PATENT DOCUMENTS

| CN | 108108358 A | 6/2018 |
|---|---|---|
| CN | 109902120 A | 6/2019 |

(Continued)

*Primary Examiner* — Hares Jami
(74) *Attorney, Agent, or Firm* — IPRTOP LLC

(57) ABSTRACT

A middleware system and method for optimizing reading and writing of scientific data files; the method comprises: receiving data writing requests from users, constructing spatial grid based on the regional mask information of written scientific data, and merging grid data blocks of same region to construct the continuous non-equal width data blocks; grouping the continuous non-equal-width data blocks based on the regional mask information of the continuous non-equal-width data blocks to obtain the grouped non-equal-width data blocks containing regional grouping information, and encoding and indexing the grouped non-equal-width data blocks to obtain the encoded non-equal-width data blocks containing indexing information; retrieving corresponding data blocks and issuing the data blocks reading instructions based on regional reading information of the users; handling the reading and writing of metadata corresponding to scientific data; managing the reading and writing of the encoded non-equal width data blocks.

9 Claims, 4 Drawing Sheets

(56) References Cited

U.S. PATENT DOCUMENTS

2020/0409553 A1  12/2020  Schlam et al.
2023/0005138 A1   1/2023  Kuang et al.

FOREIGN PATENT DOCUMENTS

| CN | 112948343 A   | * | 6/2021 | ............. G06F 16/27 |
| KR | 101628676 B1  | * | 6/2016 | ....... G06F 17/30194 |
| KR | 20170076541 A | * | 7/2017 | ....... G06F 16/24532 |
| WO | WO 2014094047 A1 | | 6/2014 | |

* cited by examiner

MIDDLEWARE SYSTEM AND METHOD FOR OPTIMIZING READING AND WRITING OF SCIENTIFIC DATA FILES

FIELD OF TECHNOLOGY

The present disclosure generally relates to the technical field of data transmission, and in particular to a middleware system and method for optimizing reading and writing of scientific data files.

BACKGROUND

Currently, in self-descriptive scientific data formats such as NetCDF and HDF5, two primary challenges are observed: inconsistencies in the methods of data writing and reading, and a lack of adaptability to complex data retrieval requests. These limitations significantly impede data reading efficiency under certain conditions. Meanwhile, the advent of novel storage technologies, such as persistent memory, has exacerbated the issue of increased overhead at the software layer, particularly in the context of data reading and writing operations. Preliminary research reveals extensive demands for regional data reading of certain irregular spaces across various disciplines, including geophysics, marine science, atmospheric science, and high-energy physics. However, existing data formats such as NetCDF, and their data organization and read and write interfaces significantly degrade in performance when handling these irregular read and write requests, leading to a considerable increase in memory usage.

In summary, current NetCDF and similar self-describing scientific data formats encounter significant read and write challenges. These include: (1) substantial software layer overhead on new storage devices, severely impacting data read and write performance; (2) inability of their file read and write interfaces and data organizations to adapt to the complex requirements of irregular regional data reading, resulting in performance degradation for such data types; and (3) a considerable increase in memory usage when dealing with complex and irregular regional data. These technical challenges pertain to the realm of storage system and file system optimization within computer science, focusing on both application-level optimization and file-system middleware optimization.

SUMMARY

In view of the above-described shortcomings of the related technologies, the present disclosure provides a middleware system and method for optimizing reading and writing of scientific data files, which solve technical issues of the related technologies, where the writing and reading processes for different scientific data files lack uniformity, and the data organization is unable to adapt to complex reading requests, resulting in low reading performance.

To achieve these and other related purposes, a first aspect of the present disclosure provides a middleware system for optimizing reading and writing of scientific data files, wherein the middleware system comprises: a regional grid construction module, which receives data writing requests from users, constructs spatial grid based on regional mask information of written scientific data, and merges grid data blocks of same region to construct continuous non-equal width data blocks; and a data block index management module, which groups the continuous non-equal-width data blocks based on regional mask information of the continuous non-equal-width data blocks to obtain grouped non-equal-width data blocks containing regional grouping information, and encodes and indexes the grouped non-equal-width data blocks to obtain encoded non-equal-width data blocks containing indexing information; wherein the data block index management module retrieves corresponding data blocks according to regional reading information of the users and issues data blocks reading instructions; a metadata read and write module, which reads and writes metadata corresponding to scientific data; a data block read and write module, which reads and writes the encoded non-equal width data blocks.

In some embodiments of the first aspect of the present disclosure, the middleware system is located in a scientific data file software library and works in memory as a database; wherein the middleware system, by receiving read and write requests of the users and altering the organization of data, interacts with an underlying data software library, writes the encoded non-equal width data blocks to external storage devices or reads the encoded non-equal width data blocks into memory from external storage devices.

In some embodiments of the first aspect of the present disclosure, a specific mode of operation of the middleware system comprises: data writing and data reading; wherein data grouping and merging is performed before data is written to the external storage devices; corresponding information is retrieved and read into memory by the data block index management module during data reading.

In some embodiments of the first aspect of the present disclosure, the scientific data file software library comprises a NetCDF software library, and the underlying data software library comprises a HDF5 software library.

A second aspect of the present disclosure provides a method for optimizing reading and writing of scientific data files, using the middleware system for optimizing reading and writing of scientific data files, wherein the method comprises optimizing data writing processes, which further comprises: receiving the data writing requests from the users by the regional grid construction module and constructing spatial grid based on the regional mask information of written scientific data, wherein the regional grid construction module merges grid data blocks of same region to construct the continuous non-equal width data blocks; grouping the continuous non-equal-width data blocks by the data block index management module based on regional mask information of the continuous non-equal-width data blocks to obtain the grouped non-equal-width data blocks containing regional grouping information, and encoding and constructing index of the grouped non-equal width data blocks to obtain the encoded non-equal-width data blocks containing indexing information; writing metadata of the scientific data to the external storage devices by the metadata read and write module, and recording regional grouping information and indexing information corresponding to the encoded non-equal-width data blocks in the external storage devices; writing the encoded non-equal width data blocks to the external storage devices in a format corresponding to the underlying data software library by the data block read and write module.

In some embodiments of the second aspect of the present disclosure, the method comprises optimizing data reading processes, which further comprises: receiving the data reading request from the users by the data block index management module, and retrieving corresponding data blocks and issuing the data blocks reading instructions based on regional reading information of the users; reading the corresponding indexing information, the regional grouping information, and metadata into memory from the external storage devices by the metadata read and write module; receiving the data blocks reading instructions by the data block read and write module to obtain the corresponding encoded non-equal width data blocks, reading the encoded non-equal width data blocks into memory from the external storage devices, and providing feedback to the users.

In some embodiments of the second aspect of the present disclosure, the data block read and write module outputs different encoded non-equal width data blocks in the data writing processes and the data reading processes; wherein in the data writing processes, the data outputted by the data block read and write module comprises regional data blocks and mixed data blocks; wherein in the data reading processes, when the region boundary is clear, the data outputted by the data block read and write module only comprises the regional data blocks; when the region boundary is fuzzy, the data outputted by the data block read and write module comprises the regional data blocks and the mixed data blocks; wherein the regional data blocks are data blocks containing only uniform regions, and the mixed data blocks are data blocks containing two or more neighboring regions.

A third aspect of the present disclosure provides a system for optimizing reading and writing of scientific data files, wherein the system comprises: an interface software library for interfacing with scientific computing applications and file systems; wherein the interface software library comprises a scientific data file software library, an underlying data software library, and an I/O interface; the scientific data file software library, comprises the NetCDF software library; and the NetCDF software library further comprises the middleware system, for optimizing reading and writing process of scientific data files; the underlying data software library comprises the HDF5 software library; and types of the file system comprises ext4, xfs, zfs, Lustre, PVFS.

A fourth aspect of the present disclosure provides a computer device comprising: a memory and a processor; wherein the memory stores a computer program, and the processor executes the computer program stored in the memory, such that the computer device implements the method as described above.

In summary, the presently disclosed middleware system and method for optimizing reading and writing of scientific data files have the following beneficial effects: the present disclosure analyzes and utilizes regional mask information of multidimensional scientific data stored in formats such as NetCDF, the method comprises grouping data based on regions, merging data within the same region into multiple non-uniform multidimensional data blocks, and consecutively storing connected data blocks according to the spatial information of the original data, to enhance the contiguity of read and write operations for data within each group. The present disclosure not only improves the performance of data reading and writing but also reduces the memory usage for reading regional data.

DETAILED DESCRIPTION

Figure 1:
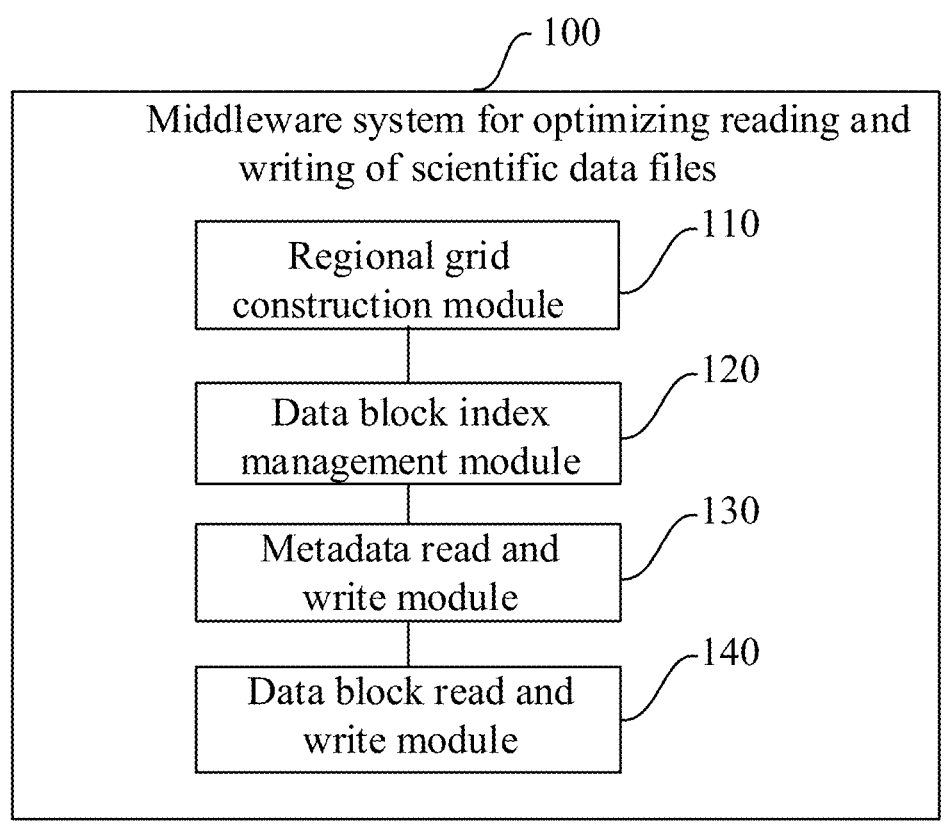
FIG. 1 shows a module diagram of a middleware system for optimizing reading and writing of scientific data files according to one embodiment of the present disclosure.

The embodiments of the present disclosure will be described below. Those skilled can easily understand disclosure advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It should be noted that the following embodiments and the features of the following embodiments can be combined with each other if no conflict will result.

In the following description, referring to the drawings, the drawings describe several embodiments of the present disclosure. It should be understood that other embodiments can also be used to implement the present disclosure, and changes in mechanical composition, structure, electrical property, and operation can be made without departing from the spirit and scope of the present disclosure. The following detailed description should not be considered as restrictive, and the scope of the embodiments of the present disclosure is limited only by the claims of the published patent. The terms used herein are only intended to describe specific embodiments and are not intended to restrict the present disclosure. Spatial-related terms, such as "up", "down", "left", "right", "below", "under", "beneath", "above", "over", etc., can be used herein to facilitate the description of the relationship between one element or feature and another element or feature shown in the figure.

Throughout the specification, unless otherwise expressly specified and qualified, the terms "mounting", "connecting", "linking", "fixing", "securing", etc., are to be understood in a broad sense. For example, there may be a fixed connection, a removable connection, or a connection in one piece; there may be a mechanical connection or an electrical connection; there may be a direct connection or an indirect connection through an intermediate medium, and there may be a connection within the two elements. For ordinary technicians in this field, the specific meanings of the above terms in this disclosure can be understood according to the specific circumstances.

As used herein, the singular forms "a", "an" and "said/the" are intended to comprise the plural forms, unless the context clearly points out differently. The terms "first", "second", "third", "fourth", etc., if any, in the specification and claims of the present invention and in the above-mentioned drawings are used to distinguish similar objects and need not be used to describe a particular order or sequence. It should be understood that the terms so used may be interchangeable, where appropriate, so that the embodiments described herein can be implemented in an order other than what is illustrated or described herein. It should be further understood that the terms "include" and "comprise" indicate the existence of the described features, steps, elements, components, items, categories, and/or groups, but do not exclude the existence, presence, or addition of one or more other features, steps, elements, components, items, categories, and/or groups. As used herein, the terms "or" and "and/or" are inclusive, and are used to comprise any of the associated listed items and all combinations thereof. Thus, "A, B or C" or "A, B and/or C" means "any of the following: A; B; C; A and B; A and C; B and C; A, B and C". Exceptions to this definition apply only when combinations of elements, functions, steps are inherently paradoxical in some way.

In order to make the purpose, technical solutions and advantages of the present disclosure more clearly understood, further details of the technical solutions of the present disclosure are described by means of the following embodiments in conjunction with the accompanying drawings. It should be understood that the specific embodiments described herein are merely illustrative of the invention and are not intended to restrict the scope of the invention.

FIG. 1 shows a module diagram of a middleware system for optimizing reading and writing of scientific data files according to one embodiment of the present disclosure. The middleware system 100 comprises:

a regional grid construction module 110, which receives data writing requests from users, constructs spatial grid based on regional mask information of written scientific data, and merges grid data blocks of same region to construct the continuous non-equal width data blocks; and a data block index management module 120, which groups the continuous non-equal-width data blocks based on regional mask information of the continuous non-equal-width data blocks to obtain the grouped non-equal-width data blocks containing regional grouping information during the data writing process, and encodes and indexes the grouped non-equal-width data blocks to obtain the encoded non-equal-width data blocks containing indexing information; wherein the data block index management module 120 retrieves corresponding data blocks according to regional reading information of the users during the data reading process, and issues the data blocks reading instructions;

a metadata read and write module 130, which reads and writes metadata corresponding to scientific data; and a data block read and write module 140, which reads and writes the encoded non-equal width data blocks.

It is to be noted that the regional grid construction module 110 is capable of constructing the continuous non-equal-width data blocks with non-uniform widths, aiming to achieve better continuity and variable sizes based on the user's data writing request. This approach enhances the continuity of data read and write operations within the group.

In some embodiments of the present disclosure, the middleware system 100 is located in the scientific data file software library and works in memory as a database; wherein the middleware system, by receiving reading and writing requests of the users and altering the organization of data, interacts with an underlying data software library, writes the encoded non-equal width data blocks to external storage devices or reads the encoded non-equal width data blocks into memory from external storage devices.

In some embodiments of the present disclosure, wherein specific operating modes of the middleware system 100 comprise: data writing and data reading; wherein the data grouping and merging is performed before the data is written to the external storage device; corresponding information is retrieved and read into memory by the data block index management module 120 during data reading. Herein, the phrase "read something into B" refers to the action of reading information from device A and then writing it into device B.

It should be noted that, the scientific data file software library comprises the NetCDF software library and many other formats, and the underlying data software library comprises the HDF5 software library and many other formats.

Meanwhile, the data block read and write module 140 outputs different encoded non-equal width data blocks in the data writing process and the data reading process.

In summary, the middleware system 100 offers a set of interfaces designed for the seamless reading and writing of scientific computing format files, such as NetCDF libraries. These interfaces ensure transparency for the user while altering the organization of the actual data. Both benchmarks and real-world application scenarios showcased substantial improvements in read performance, along with some enhancements in write performance. For regional data reading requests, in the test this disclosure achieves a read performance optimization of up to 11.9 times compared to traditional data management systems adopting NetCDF and other scientific computing formats. Also, this disclosure substantially decreases the memory footprint of regional data reads, leading a 400% improvement in memory usage efficiency during real-world application tests compared to traditional software libraries adopting NetCDF and other scientific computing formats.

It should be noted that, the division of modules of the above system is only a logical function division, and the modules can be fully or partially integrated into a physical entity or physically separated in the actual implementation. In one embodiment, these modules can all be implemented in the form of software called by processing components. In one embodiment, they can also be all implemented in the form of hardware. In one embodiment, some of the modules can also be realized in the form of software called by processing components, and some of the modules can be realized in the form of hardware. For example, the data block read and write module 140 may be a separate processing component, or it may be integrated into a chip of the system, or it may be stored in the memory of the system in the form of codes, and the function of the data block read and write module 140 may be performed by a processing component of the system. The implementation of other modules is similar. In addition, all or part of these modules can be integrated together, or can be implemented independently. The processing elements described herein may be an integrated circuit with signal processing capabilities. In the implementation process, each operation of the above method or each of the above modules may be completed by an integrated logic circuit of hardware in the processor element or an instruction in a form of software.

For example, the above modules may be one or more integrated circuits configured to implement the above method, such as one or more Application Specific Integrated Circuits (ASICs), or one or more digital signal processors (DSPs), or one or more Field Programmable Gate Arrays (FPGAs). For another example, when one of the above modules is implemented in the form of processing component calling software, the processing component can be a generic processor, such as a Central Processing Unit (CPU), or another processor that can call programs. Alternatively, these modules can be integrated together and implemented as a System-on-a-chip (SoC).

A method for optimizing reading and writing of scientific data files is further provided, using the middleware system 100 for optimizing reading and writing of scientific data files as shown in FIG. 1; the method comprises optimizing data writing process and data reading process.

Figure 2A:
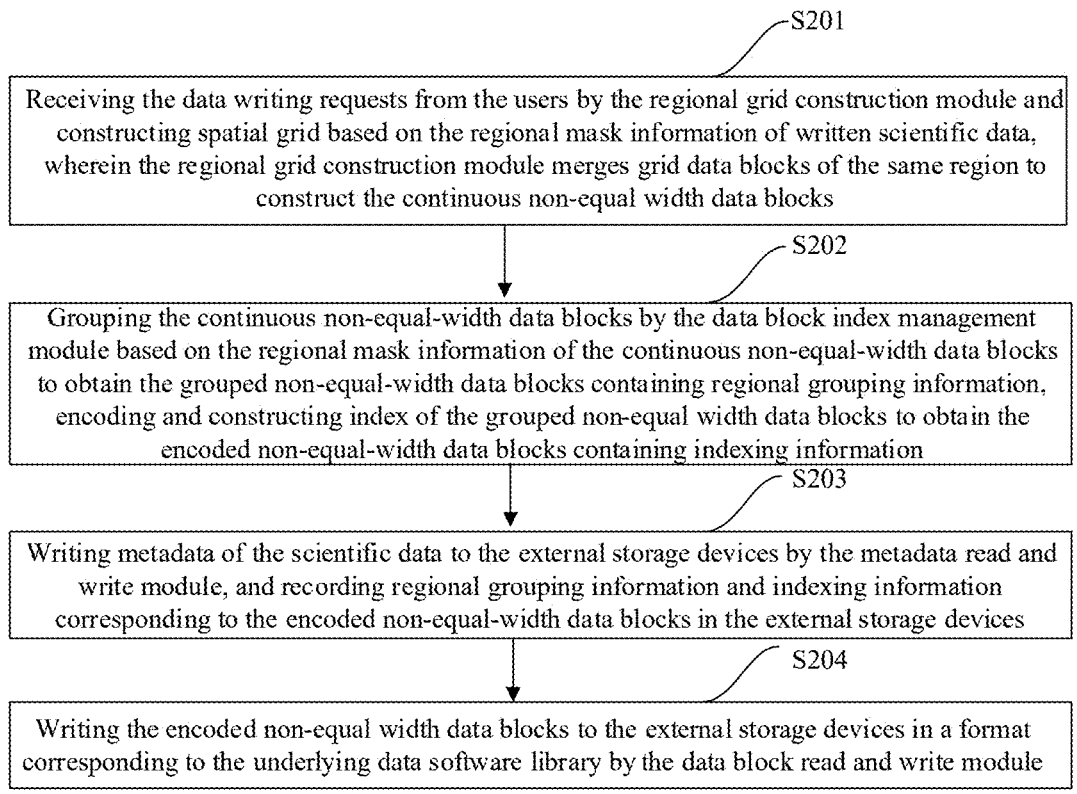
FIG. 2A shows a flowchart illustrating a method for optimizing writing of scientific data files according to one embodiment of the present disclosure.
Figure 2B:
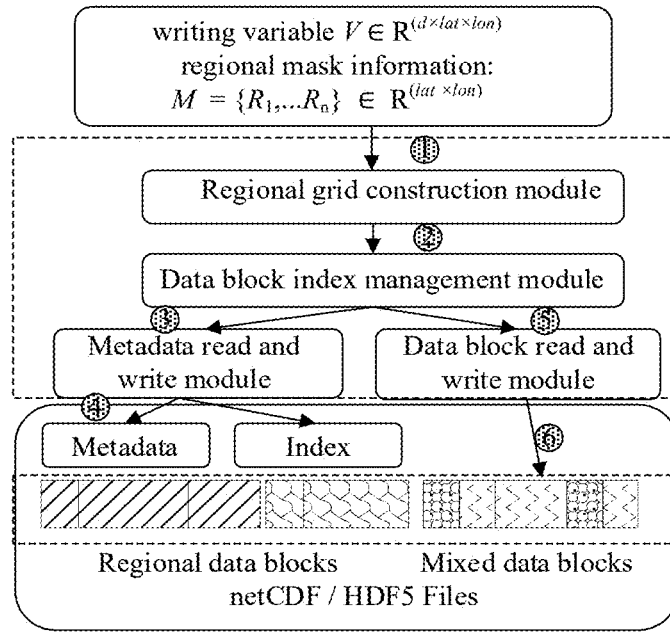
FIG. 2B shows a specific application diagram illustrating a method for optimizing writing of scientific data files according to one embodiment of the present disclosure.

FIG. 2A shows a flowchart of the method for optimizing writing for scientific data files according to one embodiment of the present disclosure. FIG. 2B shows a specific application diagram of a method for optimizing writing for scientific data files according to one embodiment of the present disclosure. The method for optimizing writing of scientific data files uses the middleware system 100 for optimizing reading and writing of scientific data files as shown in FIG. 1; the specific optimization process further comprises steps S201-S204:

S201: regional grid constructing: receiving data writing requests from the users by the regional grid construction module 110 and constructing spatial grid based on regional mask information of written scientific data, wherein the regional grid construction module merges grid data blocks of same region to construct the continuous non-equal width data blocks. Refer to the circled "1" in FIG. 2B.

The continuous non-equal width data blocks have good continuity and their sizes are variable.

S202: building indexes, grouping and merging: grouping the continuous non-equal-width data blocks by the data block index management module 120 based on regional mask information of the continuous non-equal-width data blocks to obtain the grouped non-equal-width data blocks containing regional grouping information, and encoding and constructing index of the grouped non-equal width data blocks to obtain the encoded non-equal-width data blocks containing indexing information. Refer to the circled "2" in FIG. 2B S203: metadata writing: writing metadata of the scientific data to the external storage devices by the metadata read and write module 130, and recording regional grouping information and indexing information corresponding to the corresponding encoded non-equal-width data blocks in the external storage devices. Refer to the circled "3" and "4" in FIG. 2B.

It should be noted that Metadata, also referred to as intermediary data or relay data, pertains to data about data. Primarily, it describes the attributes or properties of data, serving purposes such as indicating storage location, recording historical data, facilitating resource lookup, and managing file records. The present disclosure utilizes the metadata read and write module 130 to write metadata of the scientific data to the external storage device. The metadata comprises, but is not limited to, information such as data size, type, storage method, and similar details.

S204: formatting and writing to external storage devices: writing the encoded non-equal width data blocks to the external storage devices in a format (such as HDF5) corresponding to the underlying data software library by the data block read and write module 140. Refer to the circled "5" and "6" in FIG. 2B.

It is to be noted that during the data writing process, the information written to the external storage device comprises the metadata, the indexing information, the regional data blocks, and the mixed data blocks. Specifically, the data outputted by the data block read and write module 140 comprises the regional data blocks and the mixed data blocks.

It is to be noted that, the regional data blocks are data blocks containing only uniform regions, the mixed data blocks are data blocks containing two or more neighboring regions, and the mixed data blocks are used to hold adjacent regional data blocks that are inconveniently differentiated at a finer granularity.

Figure 3A:
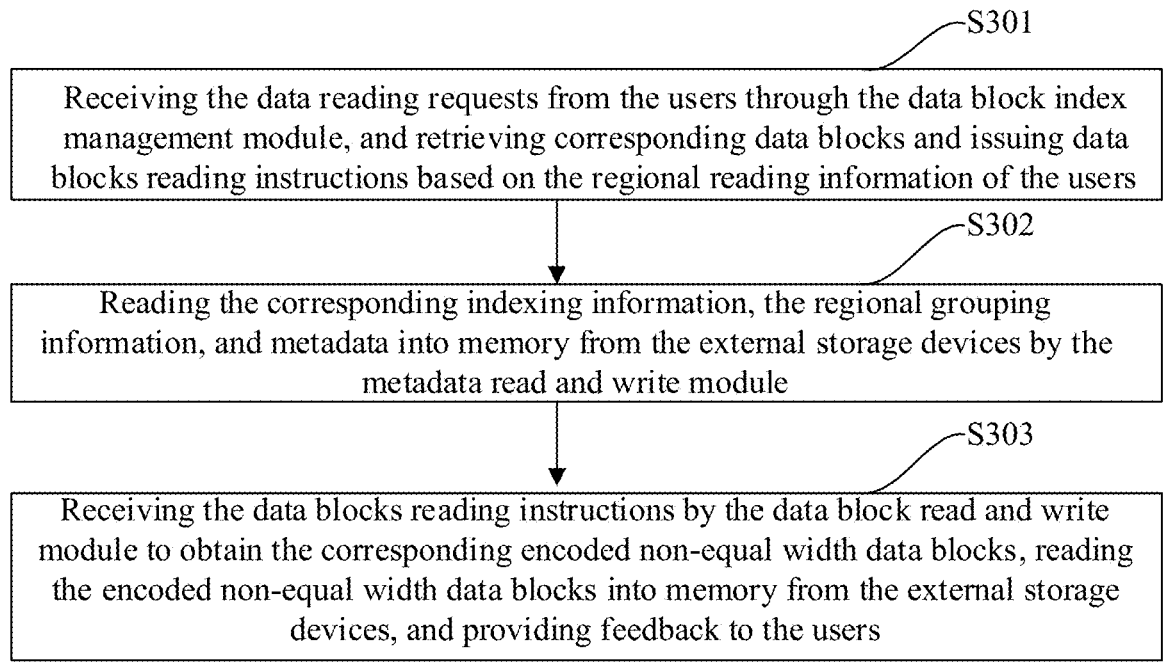
FIG. 3A shows a flowchart illustrating a method for optimizing a data reading process of scientific data files according to one embodiment of the present disclosure.
Figure 3B:
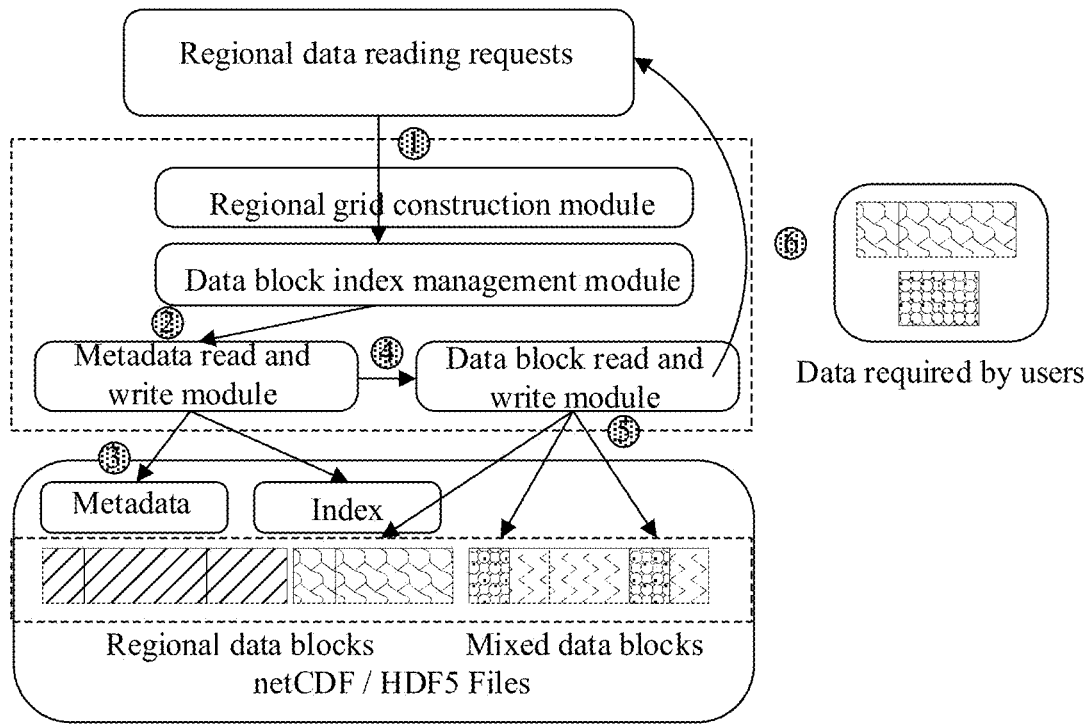
FIG. 3B shows a specific application diagram illustrating a method for optimizing a data reading process of scientific data files according to one embodiment of the present disclosure.

FIG. 3A shows a flowchart illustrating a method for optimizing a data reading process of scientific data files according to one embodiment of the present disclosure. FIG. 3B shows a specific applications diagram illustrating a method for optimizing a data reading process of scientific data files according to one embodiment of the present disclosure. The method for optimizing reading of scientific data files uses the middleware system 100 for optimizing reading and writing of scientific data files as shown in FIG. 1; the specific optimization process further comprises steps S301-303:

S301: retrieving based on read requests: receiving a data reading request from the users by the data block index management module 120, retrieving corresponding data blocks, and issuing the data blocks reading instructions based on regional reading information of the users. Refer to the circled "1" in FIG. 3B.

It is to be noted that the corresponding indexing information is retrieved by the data block index management module 120, relying on the regional information provided in the user's data reading request, and the data block index management module 120 issues data blocks reading instructions to the metadata read and write module 130.

S302: metadata reading: reading corresponding indexing information, regional grouping information, and metadata into memory from the external storage devices by the metadata read and write module 130. Refer to the circled "2" and "3" in FIG. 3B.

It is to be noted that the metadata read and write module 130 receives the data blocks reading instructions, and retrieves the corresponding index information, regional grouping information and metadata from the external storage device, and writes them into the memory.

S303: format converting and writing to memory: receiving data blocks reading instructions by the data block read and write module 140 to obtain the corresponding encoded non-equal width data blocks and reading into memory from the external storage devices in the format corresponding to the scientific data file software library, then providing feedback to the users. Refer to the circled "4" "5" and "6" in FIG. 3B.

It is to be noted that during the data reading process, the information read into the memory from the external storage device comprises one or more of the metadata, the indexing information, the regional data blocks, and the mixed data blocks. In summary, when region boundary of data is clear, the data block read and write module 140 outputs only the regional data blocks, and when region boundary of data is fuzzy, the data block read and write module 140 outputs the regional data blocks and the mixed data blocks.

Figure 4:
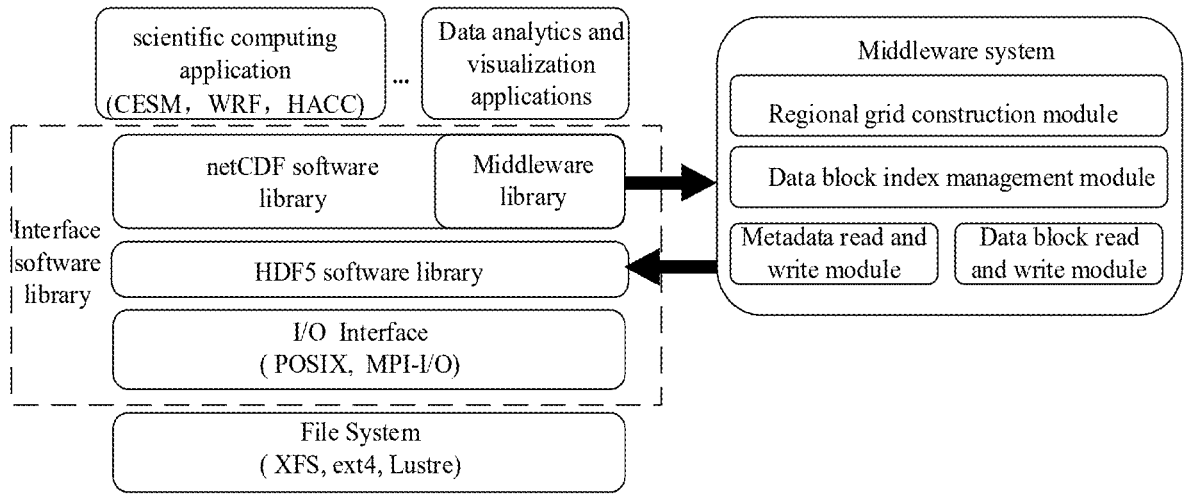
FIG. 4 shows a block diagram of a system for optimizing reading and writing of scientific data files according to one embodiment of the present disclosure.

FIG. 4 shows a block diagram of a system for optimizing reading and writing of scientific data files according to one embodiment of the present disclosure. The overall system comprises: an interface software library, which is connected to both a scientific computing application and a file system. The interface software library comprises a scientific data file software library, an underlying data software library, and an I/O interface; the scientific data file software library comprises a NetCDF software library; and the NetCDF software library further comprises the middleware system for optimizing reading and writing of scientific data files, as previously described, to facilitate the optimization of read and write operations on scientific data files. The underlying data software library comprises an HDF5 software library. Types of the file system comprises one or more of ext4, xfs, zfs, Lustre, and PVFS.

The middleware system 100 comprises the regional grid construction module 110, the data block index management module 120, the metadata read and write module 130, and the data block read and write module 140, as previously described.

It is to be noted that the middleware system for optimizing reading and writing of scientific data files provided in present disclosure is applicable to mainstream storage devices, comprising but not limited to disks, solid-state disks, and non-volatile memory, among others. Applicable file system types comprise, but are not limited to, ext4, xfs, zfs, Lustre, PVFS, etc.

In the data writing process, the data block read and write module 140 outputs complete data information, comprising the metadata, the indexing information, the regional data blocks, and the mixed data blocks, to a lower layer file system. In the data reading process, the data block read and write module 140 reads metadata and indexing information from the lower file system during the file opening phase, and then reads a data block corresponding to the accessed region from the lower layer file system according to the user access request, and reads only the regional data blocks when the regional boundary of that data is clear. When fine granularity management of this data and its neighboring regions is not possible due to file system limitations, the regional data blocks corresponding to this region, as well as the mixed data blocks containing not only this region but also its neighboring regions, are read.

Figure 5:
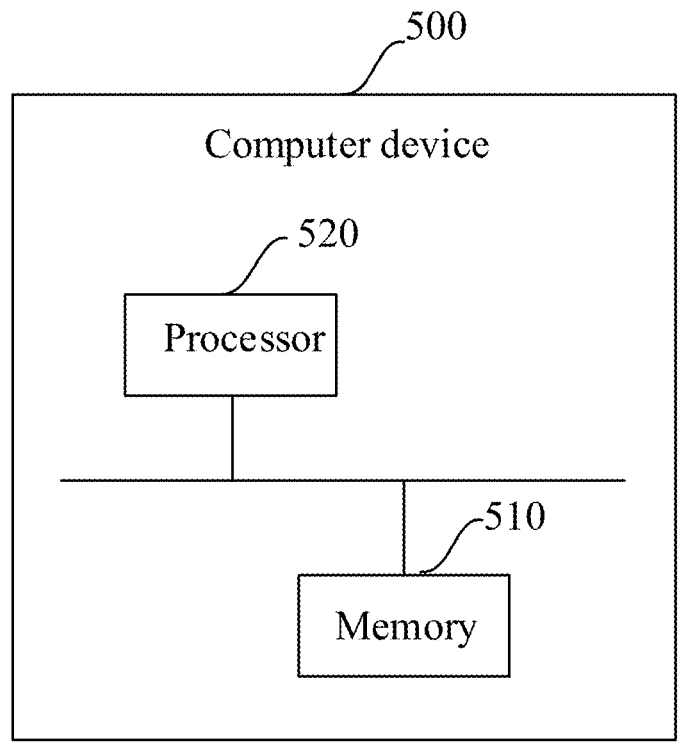
FIG. 5 shows a block diagram of a computer device according to one embodiment of the present disclosure.

FIG. 5 shows a block diagram of a computer device 500 according to an embodiment of the present disclosure. The computer device 500 comprises: a memory 510 and a processor 520; the memory 510 is used to store computer instructions; the processor 520 executes the computer instructions to implement the methods as described in FIG. 2A and FIG. 3A.

In some embodiments, there is at least one memory 510 and at least one processor 520 in the computer device 500, and in one example as shown FIG. 5, the quantity of either one is one.

In an embodiment of the present disclosure, the processor 520 in the computer device 500 will load one or more instructions corresponding to processes of the application program into the memory 510 in accordance with the steps described in FIG. 1, and the processor 520 will execute the application program stored in the memory 510, thereby realizing the methods as described in FIG. 2A and FIG. 3A.

The memory 510 may comprises Random Access Memory (RAM), or may also comprise non-volatile memory, such as at least one disk memory. The memory 510 stores an operating system and operating instructions, executable modules or data structures, or a subset, or an extended set, wherein the operating instructions may comprise a variety of operating instructions for implementing various operations. The operating system may comprise a variety of system programs for implementing various basic operations as well as for handling hardware-based tasks.

The processor 520 can be a general processor, comprising a Central Processing Unit (CPU), a Network Processor (NP), etc. It can also be a Digital Signal Processor (DSP) or an Application Specific Integrated Circuit (ASIC), a Field Programmable Gate Array (FPGA) or other programmable logic devices, discrete gates or transistor logic devices, discrete hardware components.

In some specific applications, the components of the computer device 500 are coupled together through a bus system, wherein the bus system may comprise, in addition to a data bus, a power bus, a control bus, and a status signal bus, among others. However, for clarity of illustration, the various buses are simplified as one bus system, see FIG. 5.

In summary, the present disclosure provides the middleware system and method for optimizing reading and writing of scientific data files, wherein the middleware system comprises: the regional grid construction module, which receives data writing requests from users, constructs spatial grid based on the regional mask information of written scientific data, and merges grid data blocks of same region to construct the continuous non-equal width data blocks; and the data block index management module, which groups the continuous non-equal-width data blocks based on regional mask information of the continuous non-equal-width data blocks to obtain the grouped non-equal-width data blocks containing regional grouping information, and encodes and indexes the grouped non-equal-width data blocks to obtain the encoded non-equal-width data blocks containing indexing information; wherein the data block index management module retrieves corresponding data blocks according to regional reading information of the users; the metadata read and write module, which reads and writes metadata corresponding to scientific data; the data block read and write module, which reads and writes the encoded non-equal width data blocks. This present disclosure analyzes and utilizes the regional mask information in multidimensional scientific data in a scientific computing format such as NetCDF, groups the data according to the region, merges the data within the same region into a plurality of non-equal-width multidimensional data blocks, and stores the connected data blocks consecutively according to the spatial information of the original data in order to improve the read and write continuity of the data within the group. The present disclosure not only improves the performance of data reading and writing but also reduces the memory usage for reading regional data.

Therefore, the present disclosure effectively overcomes various shortcomings of the prior art and has a high industrial value.

The above-mentioned embodiments are merely illustrative of the principle and effects of the present disclosure instead of restricting the scope of the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A middleware system for optimizing reading and writing of scientific data files, wherein the middleware system comprises:
   a regional grid construction module, which receives data writing requests from users, constructs spatial grid based on regional mask information of written scientific data, and merges grid data blocks of the same region to construct continuous non-equal width data blocks; and
   a data block index management module, which groups the continuous non-equal-width data blocks based on regional mask information of the continuous non-equal-width data blocks to obtain grouped non-equal-width data blocks containing regional grouping information, and encodes and indexes the grouped non-equal-width data blocks to obtain encoded non-equal-width data blocks containing indexing information; and/or the data block index management module retrieves corresponding data blocks according to regional reading information of the users;

a metadata read and write module, which reads and writes metadata corresponding to scientific data; and a data block read and write module, which reads and writes the encoded non-equal width data blocks.

2. The middleware system for optimizing reading and writing of scientific data files according to claim 1, wherein the middleware system is located in a scientific data file software library and works in memory as a database; wherein the middleware system, by receiving reading and writing requests of the users and altering the organization of data, interacts with an underlying data software library, writes the encoded non-equal width data blocks to external storage devices or reads the encoded non-equal width data blocks into memory from external storage devices.

3. The middleware system for optimizing reading and writing of scientific data files according to claim 2, wherein specific operating modes of the middleware system comprise: data writing and data reading; wherein data grouping and merging is performed before data is written to the external storage devices;

corresponding information is retrieved and read into memory by the data block index management module during data reading.

4. The middleware system for optimizing reading and writing of scientific data files according to claim 2, wherein the scientific data file software library comprises a NetCDF software library, and the underlying data software library comprises a HDF5 software library.

5. A method for optimizing reading and writing of scientific data files, using the middleware system for optimizing reading and writing of scientific data files as claimed in claim 1;

wherein the method comprises: optimizing data writing processes, which further comprises:

receiving the data writing requests from the users by the regional grid construction module and constructing spatial grid based on the regional mask information of written scientific data, wherein the regional grid construction module merges grid data blocks of same region to construct the continuous non-equal width data blocks;

grouping the continuous non-equal-width data blocks by the data block index management module based on the regional mask information of the continuous non-equal-width data blocks to obtain the grouped non-equal-width data blocks containing regional grouping information, encoding and constructing index of the grouped non-equal width data blocks to obtain the encoded non-equal-width data blocks containing indexing information;

writing metadata of the scientific data to the external storage devices by the metadata read and write module, and recording regional grouping information and indexing information corresponding to the encoded non-equal-width data blocks in the external storage devices; and writing the encoded non-equal width data blocks to the external storage devices in a format corresponding to the underlying data software library by the data block read and write module.

6. The method for optimizing reading and writing of scientific data files according to claim 5, wherein the method further comprises:

optimizing data reading processes, which further comprises:

receiving the data reading requests from the users by the data block index management module, and retrieving corresponding data blocks and issuing data blocks reading instructions based on the regional reading information of the users;

reading the corresponding indexing information, the regional grouping information, and metadata into memory from the external storage devices by the metadata read and write module; and receiving the data blocks reading instructions by the data block read and write module to obtain the corresponding encoded non-equal width data blocks, reading the encoded non-equal width data blocks into memory from the external storage devices, and providing feedback to the users.

7. The method for optimizing reading and writing of scientific data files according to claim 5, wherein the data block read and write module outputs different encoded non-equal width data blocks in the data writing processes and the data reading processes, wherein in the data writing processes, the data outputted by the data block read and write module comprises regional data blocks and mixed data blocks;

wherein in the data reading processes, when region boundary of data is clear, the data block read and write module outputs only the regional data blocks, and when region boundary of data is fuzzy, the data block read and write module outputs the regional data blocks and the mixed data blocks;

wherein the regional data blocks are data blocks containing only uniform regions, and the mixed data blocks are data blocks containing two or more neighboring regions.

8. A system for optimizing reading and writing of scientific data files, wherein the system comprises: an interface software library connected to a scientific computing application and a file system, wherein the interface software library comprises a scientific data file software library, an underlying data software library, and an I/O interface; wherein the scientific data file software library comprises a NetCDF software library, and the NetCDF software library further comprises the middleware system as claimed in claim 1, for optimizing reading and writing process of scientific data files;

the underlying data software library comprises an HDF5 software library; and types of the file system comprise one or more of ext4, xfs, zfs, Lustre, and PVFS.

9. A computer device, comprising: a memory and a processor;

wherein the memory stores a computer program, and the processor executes the computer program stored in the memory, such that the computer device implements the method according to claim 5.

* * * * *